US009465923B2

(12) United States Patent
Shen

(10) Patent No.: US 9,465,923 B2
(45) Date of Patent: Oct. 11, 2016

(54) BLACKOUTS ARCHITECTURE

(71) Applicant: Intel Corporation, Santa Clara, CA (US)

(72) Inventor: Kevin Shen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 13/791,319

(22) Filed: Mar. 8, 2013

(65) Prior Publication Data

US 2014/0259180 A1  Sep. 11, 2014

(51) Int. Cl.
*G06F 21/62* (2013.01)
*G06F 21/10* (2013.01)

(52) U.S. Cl.
CPC .................... *G06F 21/10* (2013.01)

(58) Field of Classification Search
CPC ......... G06F 21/60; G06F 21/62; G06F 21/10
USPC ............................ 726/1, 26, 27; 725/25, 31
See application file for complete search history.

(56) References Cited

U.S. PATENT DOCUMENTS

| 8,011,012 B2 * | 8/2011 | Carle ............... H04L 9/083 380/200 |
| 2003/0200313 A1 * | 10/2003 | Peterka et al. ........... 709/225 |
| 2004/0101138 A1 * | 5/2004 | Revital et al. ............. 380/210 |
| 2005/0125673 A1 * | 6/2005 | Cheng et al. .............. 713/182 |
| 2007/0140488 A1 * | 6/2007 | Dharmaji et al. .......... 380/212 |
| 2007/0219922 A1 * | 9/2007 | Shin et al. ................. 705/59 |
| 2007/0240229 A1 * | 10/2007 | Yoon et al. ................ 726/27 |
| 2008/0066103 A1 * | 3/2008 | Ellis et al. ................. 725/38 |
| 2008/0270308 A1 * | 10/2008 | Peterka et al. ............ 705/51 |
| 2010/0115544 A1 * | 5/2010 | Swenson ................... 725/28 |
| 2012/0174150 A1 * | 7/2012 | Reddy et al. .............. 725/31 |
| 2013/0191928 A1 * | 7/2013 | Yin et al. .................. 726/27 |
| 2013/0260796 A1 * | 10/2013 | Hasek ....................... 455/456.3 |
| 2014/0245341 A1 * | 8/2014 | Mack et al. ............... 725/25 |

* cited by examiner

*Primary Examiner* — Shanto M Abedin
(74) *Attorney, Agent, or Firm* — Schwabe, Williamson & Wyatt, P.C.

(57) ABSTRACT

In embodiments, apparatuses, methods and storage media are described that are associated with blackout rules for media content. In embodiments, one or more segments may be generated from the media content, one or more of the generated segments containing a blackout rule identifier. The blackout rule identifier may identify a blackout rule describing one or more limitations to access to the piece of media content. When displaying the media content, a client device may retrieve the blackout rule based at least in part on the blackout rule identifier. The client device may then limit access to the media content if directed to do so by the blackout rule.

21 Claims, 6 Drawing Sheets

BLACKOUTS ARCHITECTURE

TECHNICAL FIELD

The present disclosure relates to the field of data processing and specifically to controlling access to media content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of multimedia content, and the manners in which the content is consumed. Today, multimedia content may be made available from fixed media (e.g., Digital Versatile Disc, or "DVD"), broadcast, cable operators, satellite channels, the Internet, and so forth. Users may consume content with a television set, a laptop or desktop computer, a tablet, a smartphone, or other devices of the like. In general, content may be consumed in a distributed manner, for example retrieved from a server at multiple distributed locations. In certain instances, it may be desirable for access to the content to be controlled, for example to enforce viewing restrictions on sporting events.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
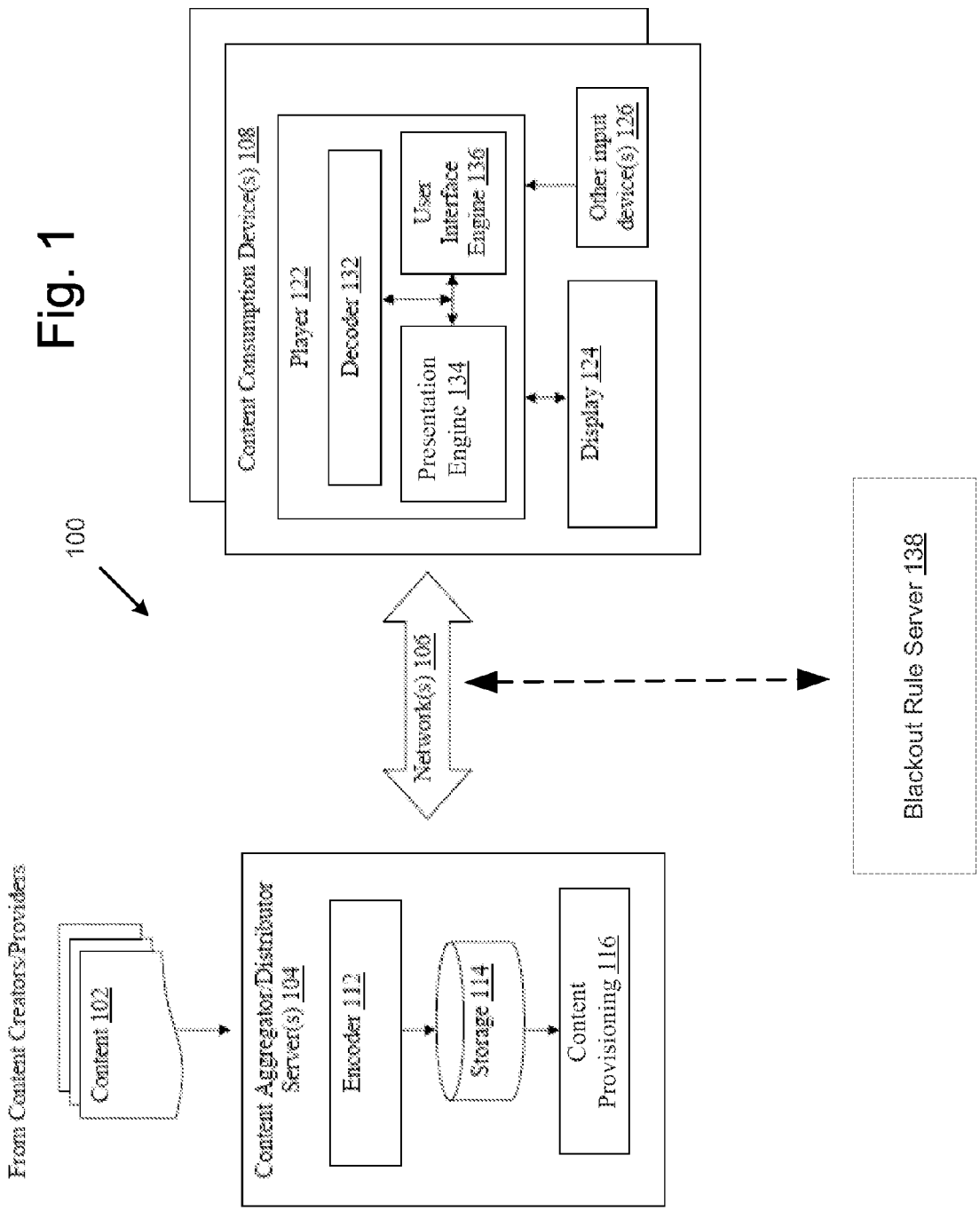
FIG. 1 illustrates an arrangement for content distribution and consumption, in accordance with various embodiments.

Apparatuses, methods and storage media associated with content distribution and/or consumption are disclosed herein. In embodiments, media content may be encoded as multiple segments of content which are retrieved by a content consumption device from a centralized server. The segments may include segment data boxes ("SDBs") containing data for the segments. One or more of the SDBs may contain an identifier, referred to herein as a rule identifier (rule ID). In embodiments, the rule ID may refer the content consumption device to a blackout rule contained on a server such as a content server or a rule server, which the content consumption device may then access. In some embodiments, the content consumption device may also authenticate that the blackout rule is valid before downloading the blackout rule from the server. The blackout rule may, in various embodiments, contain information related to a blackout period for the content that may define whether, and/or under what conditions the content may be displayed by the content consumption device. For example, in some embodiments the blackout rule may include one or more limitations to access to the content based on variables such as time, date, geographical area, and/or consumer identity. The content consumption device may then follow the blackout rule and either allow access to, or limit access to, the media content indicated by the blackout rule.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement for content distribution and consumption, in accordance with various embodiments, is illustrated. As shown, in embodiments, arrangement 100 for distribution and consumption of content may include a number of content consumption device(s) 108 coupled with one or more content aggregator/distributor servers 104 via one or more networks 106. Content aggregator/distributor servers 104 may be configured to aggregate and distribute content 102 to content consumption device(s) 108 for consumption, via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption device(s) 108 in response to requests from the various content consumption device(s) 108. Content 102 may be multimedia content of various types, having one or more of video, audio, and/or closed captions, from a variety of content creators and/or providers. Examples of content may include, but are not limited to, movies. TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality of service (QoS) levels. The different versions or levels may provide different resolutions, different bitrates, and/or different frame rates for transmission and/or playing, collectively generally referred to as QoS parameters. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Content provisioning 116 may, in various embodiments, be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. Streaming protocols may include the MPEG Dynamic Adaptive Streaming over Hypertext Transfer Protocol (MPEG-DASH) protocol defined ins ISO/IEC 23009-1 (04-01-2012), and/or some other streaming protocol such as hypertext transfer protocol live streaming (HLS). Transmission protocols may include, but are not limited to, the transmission control protocol (TCP), user datagram protocol (UDP), and so forth. Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor servers 104 go through to communicate with content consumption device(s) 108. Similarly, at the content consumption end, networks 106 may include base stations and/or access points, through which content consumption device(s) 108 communicate with content aggregator/distributor servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In embodiments, player 122 may include decoder 132, presentation engine 134 and user interface engine 136. Decoder 132 may be configured to receive streamed content, decode, and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive the user selections/inputs from a user.

While shown as part of a content consumption device 108, display 124 and/or user input device(s) 126 may be stand-alone devices or integrated, for different embodiments of content consumption device(s) 108. For example, for a television arrangement, display 124 may be a stand-alone television set, Liquid Crystal Display (LCD), Plasma, and the like, while player 122 may be part of a separate set-top set, and other user input device 126 may be a separate remote control or keyboard. Similarly, for a desktop computer arrangement, player 122, display 124 and other user input device(s) 126 may all be separate stand-alone units. On the other hand, for a laptop, ultrabook, tablet or smartphone arrangement, player 122, display 124 and other input devices 126 may be integrated together into a single form factor. Further, for tablet or smartphone arrangement, a touch sensitive display screen may also server as one of the other user input device(s) 126, and player 122 may be a computing platform with a soft keyboard that also include one of the user input device(s) 126.

In some embodiments, and as will be described in more detail below, content aggregator/distributor server(s) 104 may further include blackout rules relating to the display of the content at the content consumption device(s) 108. Additionally or alternatively, the content aggregator/distributor server(s) 104 and/or the content consumption device(s) 108 may be coupled with a blackout rule server 138 via network (s) 106. The blackout rule server 138 may be configured to provide a blackout rule to one or both of the content aggregator/distributor server(s) 104 and content consumption device(s) 108.

Figure 2:
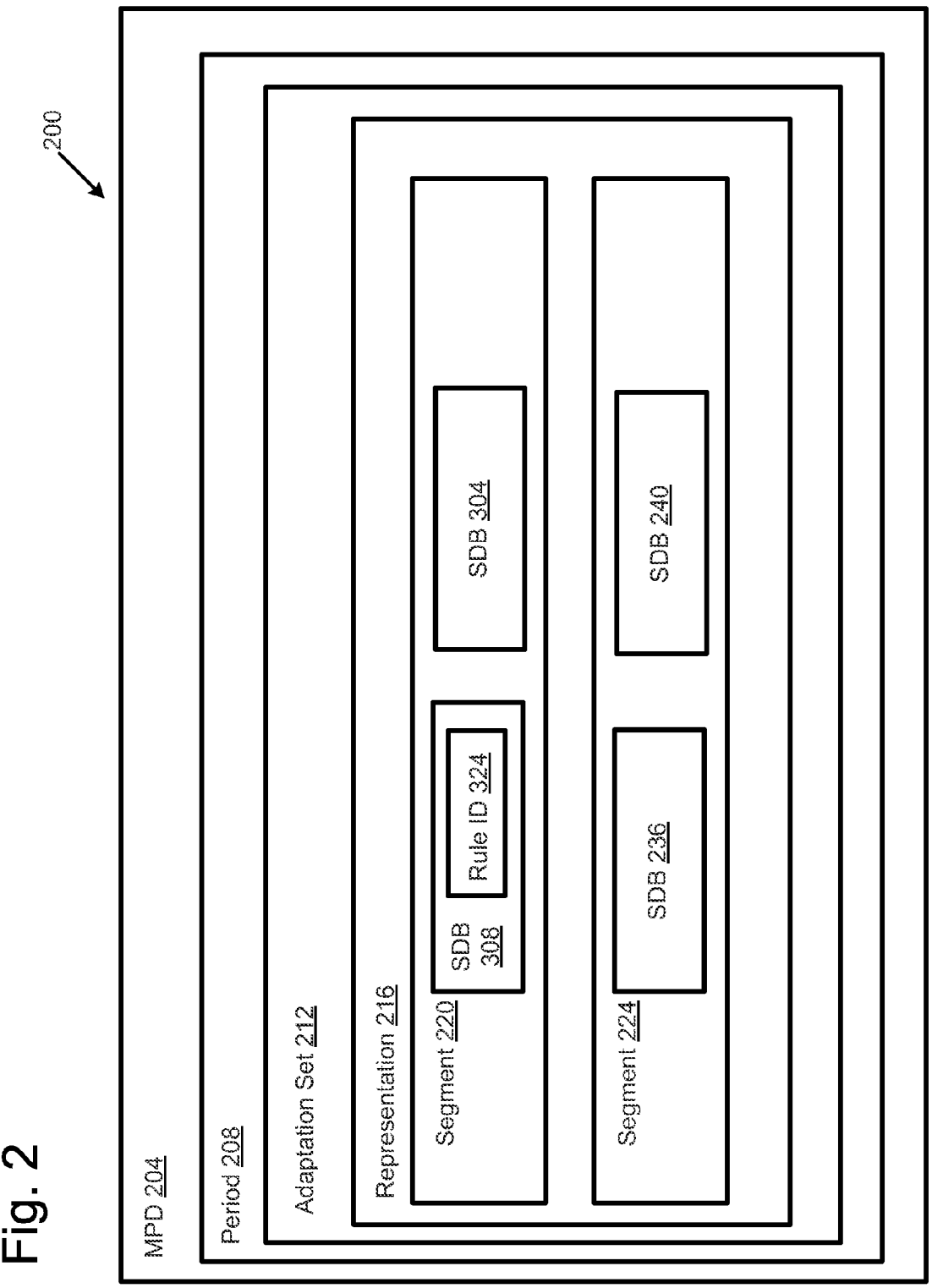
FIG. 2 illustrates an arrangement of content in multiple nested structures, in accordance with various embodiments.

FIG. 2 depicts exemplary encoded media 200. In embodiments, content 102 may be encoded by encoder 112 into different versions of the encoded media 200, with the different versions having different bit rates, channels, sizes, or some other parameter which may generally collectively referred to as a QoS parameter defining a QoS level, as described above. Each version of the encoded media 200 may then be divided into discrete segments which can then requested by the content consumption device 108, such as described in further detail below. Specifically, the content consumption device 108 may send a request via hypertext transfer protocol (HTTP) or some other internet protocol to a server such as a content aggregator/distributor server 104. The content aggregator/distributor server 104 may respond by providing the requested segment.

A potential benefit of the content 102 being encoded into different versions according to multiple different QoS parameters and QoS levels may be realized when content consumption device 108 detects that a lower QoS level is necessary, or a higher QoS level is permissible, then the content consumption device 108 may simply request a segment at a different QoS level. Similarly, the content consumption device 108 may request different segments if a viewer of the content 102 requests additional features such as different audio streams, close captioning, or the like. The content aggregator/distributor server 104 may respond by supplying the segment at the different QoS level, rather than having to supply and re-buffer the entire content 102. This allows the viewing of the content 102 to take place in a more dynamic fashion without lengthy buffering or re-buffering periods.

Returning to FIG. 2, the encoded media 200 may include a media presentation description (MPD) 204 document. The MPD may describe a one or more periods 208, where each period 208 may represent a media content period during which a consistent set of encoded versions of the media content may be available. In other words, the set of available bitrates, languages, captions, subtitles, or other QoS parameters or QoS levels may remain unchanged during the period 208. Although only a single period 208 is depicted in FIG. 2, other embodiments may have an MPD 204 with multiple periods, each having different available bitrates, languages, captions, subtitles, or other QoS parameters or QoS levels.

Within a period 208, the media may be arranged into adaptation sets 212. The adaptation set 212 may represent a set of interchangeable encoded versions of one or more media content components such as a video component, an audio component, etc. Other components, such as captions or audio descriptions, may likewise have a separate adaptation set 212. Although only a single adaptation set 212 is shown in FIG. 2, in other embodiments each period 208 may comprise a plurality of adaptation sets 212.

Each adaptation set 212 may comprise one or more representations 216. A representation may describe the deliverable encoded versions of one or several media content components of the content 102. For example, a representation 216 may include one or more media streams for each media content component such as audio components, video components, captions, or audio descriptions. In general, any single representation 216 within an adaptation set 212 may be sufficient to render the contained media content components. In embodiments, each adaptation set 212 may include a plurality of representations 216.

Each representation 216 may be divided into one or more segments 220 and 224. In general, a segment 220 and 224 may be considered to be a largest unit of the encoded media 200 that may be retrieved by a single HTTP request. In embodiments, the segment 220 may have a different length or duration than segment 224. In some embodiments, the segment length may vary between representations such that the length of segment 220 and 224 in representation 216 may be on the order of a few seconds, while in another representation the length of a segment may be as long as the length of the representation or some value in between.

In embodiments, each segment such as segment 220 or segment 224 may be encoded according to an ISO base media file format such as that defined in ISO/IEC 14496-12:2012; in other embodiments, other encoding schemes and/or formats may be used to encode the segments 220 and/or 224. Specifically, each segment such as segment 220 or segment 224 may comprise a plurality of SDBs, such as SDBs 308 and 304 in the example of segment 220 or SDBs 236 and 240 in the example of segment 224. In some embodiments the SDBs, for example SDB 308, may comprise a rule ID 324, as described more fully with respect to FIG. 3.

Figure 3:
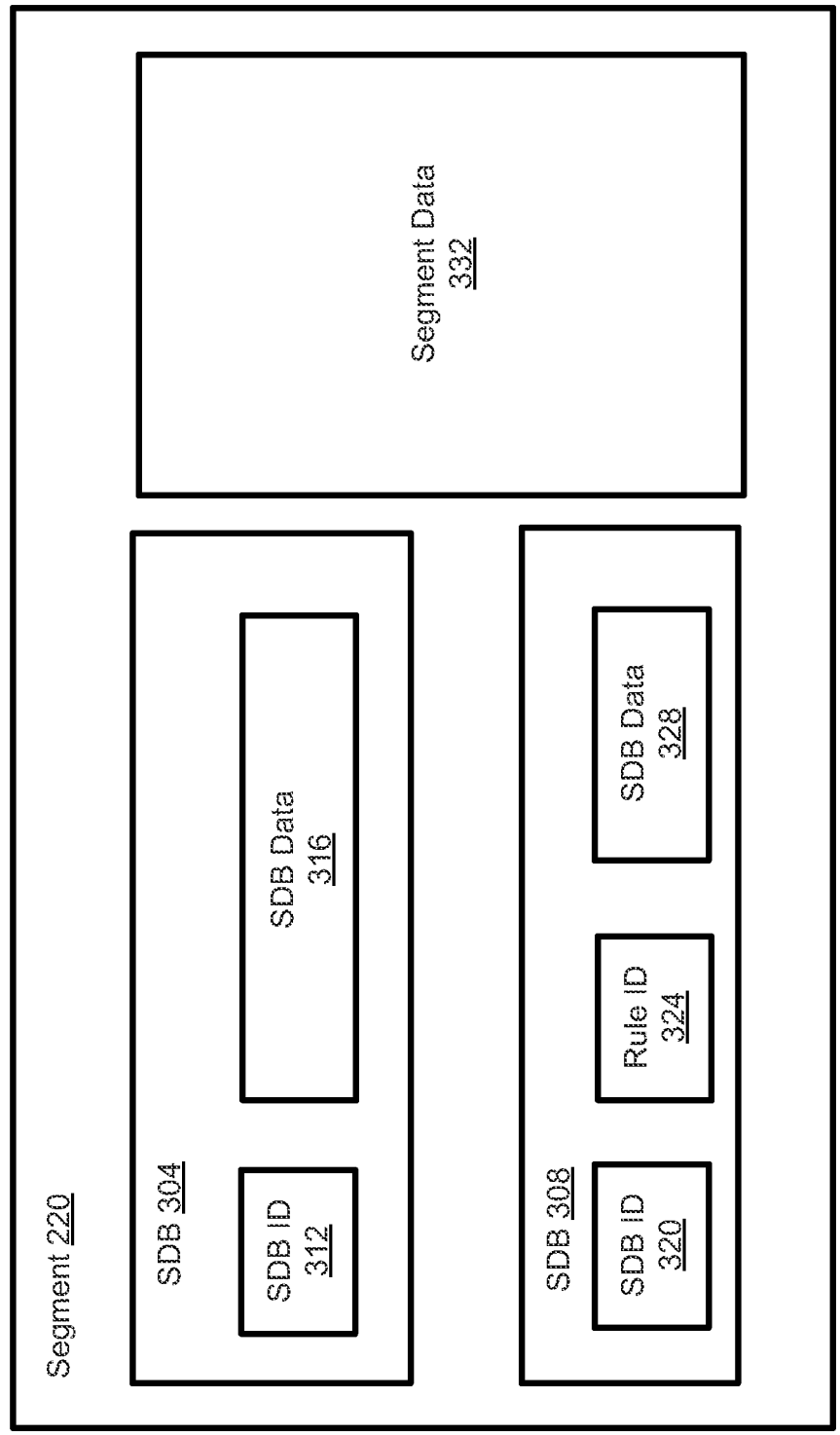
FIG. 3 illustrates an example of segment data boxes ("SDBs") contained within segments of content, in accordance with various embodiments.

As shown in FIG. 3, as segment 220 may comprise a plurality of SDBs such as SDB 304 and SDB 308. In some embodiments, a segment 220 may include additional segment data 332. The SDBs, for example SDB 304, may comprise a segment data box identifier (SDB ID) 312 which represents the type of SDB data 316 the SDB 304 includes. For example, SDB data 316 may include data such as, for example, one or more of: segment index data, scheme type data, a protection system specific header, media data, movie fragments, or other types of SDB data defined in the ISO base media file format, the MPEG-DASH specification, or other segment specifications.

In some embodiments, the SDB ID 320 of a SDB such as SDB 308 may identify the SDB 308 as including a rule ID 324. In embodiments, the rule ID 324 may contain an identifier such as an Internet uniform resource locator (URL) or some other type of identifier that allows the content consumption device 108 to access a blackout rule stored at a remote location. In various embodiments, blackout rules may be stored at remote locations such as a content aggregator/distributor server 104 and/or the blackout rule server 138.

In some embodiments, the rule ID 324 may contain information such as a blackout rule number and/or a blackout rule version. In embodiments, the blackout rule number may simply be an incrementing integer that identifies a unique blackout rule. The blackout rule version may include a version number that serves to differentiate between two different versions of the same blackout rule, as described in further detail below. As an example, if a blackout rule is the first blackout rule in a set of possible blackout rules, and the version is the first version of the blackout rule, then the rule ID 324 may simply be "1-1"; however different syntaxes may be used in different embodiments.

The SDB 308 may be referred to as a universally unique identifier (uuid) SDB type, and have a container format of a movie fragment SDB (moof) or user data SDB (udta) In some embodiments the SDB 308 may include SDB data 328. In various embodiments, the SDB data 328 may include one or more of the following elements:

Rule ID Count: Rule ID count may denote a number of rule IDs that may be included in the SDB 308. If there are no blackout rules in effect, this number may be 0. However, the rule ID count element may still be required to denote the fact that no blackout rule is in effect; otherwise, in some embodiments the content consumption device 108 may treat the segment as "suspect" and block the content 102.

Original Channel ID: Original channel ID may denote an original channel ID to which the blackout rule applies. This element may be used to determine whether the content consumption device 108 needs to download the blackout rule specified by the rule ID 324. If the content consumption device's 108 original channel matches this value, then it may download and possibly apply the blackout rule.

Segment Timestamp: Segment timestamp may denote a timestamp which uniquely identifies this segment, for example segment 220, within the encoded media 200. The segment timestamp may be the same as elements such as the baseMediaDecodeTime element from the 'tfdt' SDB type defined by the ISO base media file format, or the earliest_presentation_time element from the 'sidx' SDB type defined by the ISO base media file format. Segment timestamp may be used in conjunction with channel ID to make sure the signature will be unique, even if there are no blackout rules listed.

Channel ID: Channel ID may denote the ID of the channel to which the encoded media 200 belongs. Channel ID may be used in conjunction with segment timestamp, as described above, to make sure the signature element described below will be unique, even if there are no blackout rules listed.

In some embodiment, the segment timestamp and channel ID elements may be included in the SDB 308 to prevent spoofing of the entire stream of encoded media 200. In other words, the segment timestamp and channel ID elements may prevent a hacker from playing a stream of content 102 from a first channel using the URL for a second channel, or play a previous stream of content from a channel as current segments of the channel. In embodiments, the content consumption device 108 may already have the channel ID and the segment timestamp elements previously stored.

The SDB data 328 may additionally or alternatively include authentication data such as a "signature" element that allows authentication of the SDB 308. For example, when the content 102 is encoded into encoded media 200, the SDB may be signed by the encoder 112 using a private key. This signature may be appended to the end of the SDB 308 as SDB data 328, or included elsewhere in the encoded media 200. In some embodiments, the signature may additionally or alternatively include a segment timestamp or a channel ID in the SDB data 328. When the decoder 132 of the content consumption device 108 decodes the segment 220, then the same private key or a corresponding public key may be used to verify the signature appended by the encoder 112. In this manner, the rule ID 324 contained within the SDB 308 may be verified. By using this type of authentication and verification process, it may be significantly harder for a third party to remove the rule ID 324 and possibly replace it with an alternative rule ID pointing to a different blackout rule as described above. In embodiments, if the content consumption device 108 can not verify one or more of the signature, the segment timestamp, and the channel ID, then the content consumption device 108 may treat the segment 220 as suspect and apply a default blackout rule to the segment 220 or the encoded media 200.

In embodiments, the blackout rule retrieved by the rule ID 324 may contain information that provides for a "blackout" of the content 102. For example, in certain cases content 102 related to sporting events may be subject to a blackout period where the sporting event should not be shown in a certain geographical area or to a certain audience. As an example, games of a sports team may be shown when the team is playing an away game, but those same games may not be locally broadcast during a home game in order to maximize the number of people that go to the home games. Other content 102 may likewise be subject to blackout periods for various reasons including religious, ethical, and/or contractual obligations relating to the content 102.

As described above, the blackout rule referred to by the rule ID 324 may serve to enforce these blackout periods. In some embodiments, the blackout rule itself may be written in JavaScript Object Notation (JSON) or some other programming language. In embodiments, the blackout rule itself may have one or more of the following described elements:

Rule ID: As noted above, the rule ID 324 may be used by the content consumption device 108 to identify the blackout rule. The rule ID 324 may include a blackout rule number and a blackout rule version, as described above.

Channel ID: The channel ID may be used to identify the channel affected by the blackout rule. Thus, if different content 102 is transmitted from the content aggregator/distributor server 104 to the content consumption device 108 on different channels, the channel ID may be used to distinguish which content should be subject to the blackout by matching to the channel ID element in the SDB data 328 of the segment 220 described above.

Timestamp: The timestamp may identify the date and time that the current version of the blackout rule is published.

Start Time: The start time may dictate the time and/or date that the blackout rule may begin to take effect. For example, if a sports event is scheduled to begin at 3 pm on Jan. 1, 2013, and the sports event is subject to a blackout, then the blackout rule may contain a start time of 3 pm on Jan. 1, 2013 for that sports event.

End Time: The end time may indicate the time and/or date at which the blackout rule may finish taking effect. For example, if a movie with a known length is subject to the blackout, then the end time may indicate when the blackout of the movie should be finished. In some embodiments, the end time may be optional, such as if the content 102 is a sports event of indeterminate length. Embodiments of how an end time may be optionally used are further explained below.

Expiration Time: The expiration time may indicate the time and/or date after which the entire blackout rule may have no effect. The expiration time may be used to expire a blackout rule, for example if the media provider has catch-up rights for a sports event and is allowed to play the content 102 anywhere after the original showing of the content 102, even in regions that were originally blacked out. In some embodiments the expiration time may be optional.

Actions: Actions may be an array of one or more sub-elements of a blackout rule that may apply to the same channel with the same start and end times. Actions may include zips, regions, new channel ID, or joint photographic experts group (JPEG) URL, such as described in further detail below.

Zips: Zips may describe an array of zip codes or partial zip codes that the blackout rule may apply to. For example, zips may describe partial zip codes such as "972" or full zip codes such as "97211."

Regions: Regions may describe an array of region codes that the blackout rule may apply to. In some embodiments, regions may include information related to telephonic area codes, city, state, and/or national identifiers, GPS coordinates, ISPs, and/or some other sort of regional identifier. In some embodiments, only one of zips or regions may be required.

New Channel ID: New channel ID may indicate an alternative channel to show during the blackout period. For example, if a viewer requests content 102 on a channel subject to a blackout, then new channel ID may specify that an alternative channel with alternative content be shown.

JPEG URL: JPEG URL may provide a locator such as a URL to retrieve a JPEG to show in place of the blacked out content. For example. JPEG URL may cause the content consumption device 108 to retrieve a JPEG providing a message such as "This content is not available in your area" or some other message or JPEG. In embodiments, new channel ID and JPEG URL may not be used together, while in others they may be used in conjunction with one another. In some embodiments, even if a JPEG comprising a static image is being displayed as a result of the JPEG URL, the content consumption device 108 may continue to receive segments such as segment 220 with rule IDs such as rule ID 324 corresponding to blackout rules described above.

The above described blackout rule elements provide several advantages. For example, if the content 102 relates to a live sporting event, then the end time of the sporting event may be unknown for a variety of reasons such as overtime, awards ceremonies, and the like. Therefore, a blackout rule may be initially published, for example using the rule ID "1-1," which does not contain an end time or an expiration time. However, as the sporting event nears its end, the end time may be predicted more accurately. Therefore, the rule ID may be updated to refer to a new version of the blackout rule, e.g. "1-2" which includes an end time and/or an expiration time for the blackout rule. If the content 102 is divided into a plurality of segments 220, each containing the rule ID 324, then as segments are requested and retrieved, the initial blackout rule "1-1" may be used to enforce the blackout of the content 102. When the blackout rule is updated with the end time and/or expiration time, then the content consumption device 108 may receive a segment 220 with an updated rule ID 324, e.g. "1-2," which points to the updated blackout rule. In this manner, the content consumption device 108 may be able to dynamically determine when the blackout period should end.

In an alternative embodiment, a blackout rule may be initially published, for example using the rule ID 324 "1-1," which does not contain an end time or an expiration time. In certain content 102, for example sporting events, the end of the content 102 may occur too quickly to publish a new rule. Therefore, a new rule ID 324 could be inserted into segments 220 that did not contain blackout information. In some embodiments, this may be considered a "null" rule ID, and serve as only a place holder in the segments 220 for use, for example, with the signature and authentication process discussed above.

In other embodiments, segments 220 that are transmitted to the content consumption device 108 may not carry a rule ID 324. In these embodiments, the blackout rule would then be implicitly terminated because the content consumption device 108 would not retrieve or enforce a blackout rule as directed by a rule ID 324. In some embodiments the implicit expiration of the blackout rule could provide the advantage of not requiring the creation and enforcement of an extra rule that directed the end of a blackout period, thereby reducing time and/or resources associated with the blackout. In some embodiments, updated blackout rule "1-2" may contain different channel IDs, or other elements that differ from blackout rule "1-1."

In some embodiments, by providing the region, new channel ID, JPEG URL, and zip action elements, the same blackout rule may perform different actions for different sets of viewers, for example viewers in different regions or different zip codes. For example, the same blackout rule may direct content consumption devices 108 in one area to show a specific JPEG according to the region and JPEG URL elements, while content consumption devices 108 in another area may be identified by zip code and be directed to show a different channel according to new channel ID. As further examples, a first set of viewers may be identified and shown a first JPEG URL, as described above, and a second set of viewers may be identified and shown a second JPEG URL. In other embodiments, the blackout period may start for the different sets of viewers, so a first set of viewers may receive a "preview" period at the beginning of the content 102, while a second set of viewers does not receive the "preview" period. Other embodiments may have different combinations of the above described elements and action elements, and provide additional advantages.

In some embodiments, these different actions or elements may be the result of different rule IDs 324 in the same segment which refer to different blackout rules. For example, even though several embodiments described above are described as only having a single rule ID 324 per segment 220, in some embodiments a segment 220 may contain a plurality of rule IDs 324 which may be the same or different from one another. As an example, a segment 220 may have a first rule ID 324 that indicates a first blackout rule for a first set of viewers, and a second rule ID 324 that indicates a second blackout rule for a second set of viewers. In these embodiments, the rule IDs may indicate different blackout rules that provide different blackout experiences to different sets of users, as described above.

In some embodiments, when the new channel ID element is used to redirect a content consumption device 108 from a first channel to a second channel, then segments 220 of the content 102 in the second channel may carry a rule ID 324 referring to the same blackout rule as the first channel. By using the same blackout rule, the content consumption device 108 may remain tuned to the second channel. In some embodiments, the content consumption device 108 may retain knowledge of the fact that it was originally tuned to the first channel. Therefore, when the blackout rule is ended, either by the end time element described above, a null rule ID 324, a missing rule ID 324, or some other method, then the content consumption device 108 may retune back to the first channel.

Figure 4:
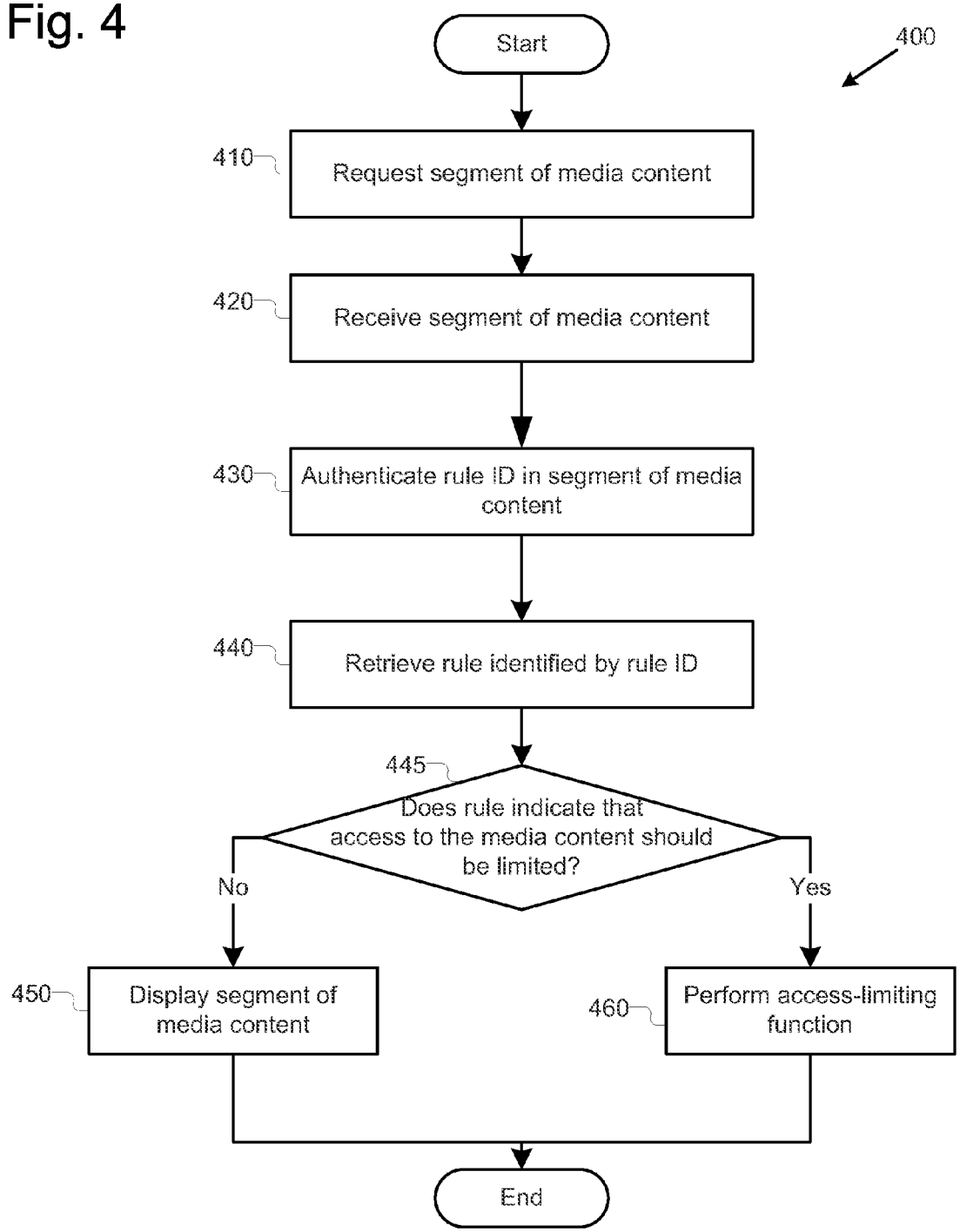
FIG. 4 illustrates an example process for applying a blackout rule to content, in accordance with various embodiments.

FIG. 4 depicts an exemplary process 400 for receiving and applying a blackout rule. A content consumption device 108 may send a request to a content aggregator distributor server 104 for access to content 102. Specifically, the content consumption device 108 may request a segment 220 of the encoded media 200 at 410. In response, the content aggregator/distributor server 104 may send the segment 220 to the content consumption device 108 at 420.

The content consumption device 108 may authenticate a rule ID 324 in the segment 220 at 430. In various embodiments, the authentication may be performed, for example, using one or more of the signature, the channel ID, and the timestamp included in the SDB data 328 of the SDB 308 of the segment 220.

After the rule ID 324 has been authenticated, then the content consumption device 108 may retrieve the blackout rule identified by the rule ID 324 at 440. As described above, the blackout rule may be retrieved, in various embodiments, from the content aggregator/distributor server 104 and/or a blackout rule server 138.

After the blackout rule has been retrieved, the content consumption device 108 may determine whether the blackout rule indicates that access to the encoded media 200, e.g. the segment 220 including the rule ID 324, should be limited at 445. In other words, the content consumption device 108 may determine whether the blackout rule describes a blackout period for the encoded media 200.

If the blackout rule does not indicate that the encoded media 200 should be blacked out, then the content consumption device may display the content at 450, for example by decoding it using decoder 132 and displaying it on display 124. However, if the blackout rule does indicate that the content should be blacked out, then the content consumption device 108 may perform an access-limiting, or blackout, function at 460 such as showing a different channel, retrieving a URL, or one of the other actions indicated by an element of the blackout rule as described above.

In some embodiments, one or more application programming interfaces (APIs) may be utilized to implement process 400 of FIG. 4. In other embodiments, other interfaces and/or operations may be utilized for implementing the processes and techniques described herein. For example, a server such as a content aggregator/distributor server 104 and/or a separate blackout rule server 138 may utilize the following APIs:

Add rule: Add rule may be called by a management utility or entity to add a blackout rule to the server.

Modify rule: Modify rule may be called by a management utility or entity to modify an existing blackout rule, for example to create a new version of an existing blackout rule.

Cancel rule: Cancel rule may designate an end time for a blackout rule such that the blackout rule is no longer broadcast. For example, cancel rule may be used to designate that a rule ID 324 should no longer be included in segments 220.

An encoding server, for example content aggregator/distributor server 104 may use additional APIs:

Get Applicable Rules: The Get Applicable Rules may be an API called by the encoding server such as content aggregator/distributor server 104. The get applicable blackout rules API may allow the encoding server, for example content aggregator/distributor server 104, to query a separate server such as blackout rule server 138 or a separate module of the content aggregator/distributor server 104 to identify a blackout rule applicable to the content 102 currently being encoded, for example by encoder 112. The get applicable rules API may, in some embodiments, have two elements, channel ID and segment time. Channel ID may be the ID of the channel being encoded, for example by encoder 112. Segment time may refer to the time of the segment, for example segment 220, being encoded, for example by encoder 112. The server containing the applicable blackout rule may respond with information related to specific channel IDs and timestamps of the segment(s) to which a blackout rule applies.

A content consumption device 108 may additionally use one or more of the following APIs:

Get Rule: The get rule API may be called by the content consumption device 108 to obtain the blackout rule specified by rule ID 324. In response, the content consumption device 108 may receive from the blackout rule server 138 and/or the content aggregator/distributor server 104 one or more of the blackout rule elements described above such as rule ID, timestamp, channel ID, start time, end time, expiration time, or one or more of the action elements. In addition, the content consumption device 108 may receive a signature that may be used to verify the blackout rule. In some embodiments, the signature may originate with the encoder 112 or the content aggregator/distributor server 104 and be received by the content consumption device 108 from the blackout rule server 138 and/or the content aggregator/distributor server 104 along with the blackout rule.

Set Location: The set location API may be used to identify the location of the content consumption device 108, for example through the use of zip codes or any of the region codes or other location information discussed above with respect to the region and zip elements.

Set Actual Channel: The set actual channel API may be an API that the content consumption device 108 calls to set the actual current channel, if it is different from the one the content consumption device 108 is currently tuned to. This API may allow the content consumption device 108 to decide whether to show metadata from the retuned channel.

Although certain elements, sub-elements, SDB data, and APIs are described above, in other embodiments similar elements may have different names for one or more of the elements, sub-elements, SDB data and/or APIs. Additionally, other embodiments may have more or less elements, sub-elements, SDB data, and/or APIs, while in some embodiments one or more of the elements, sub-elements, SDB data, and/or APIs may be divided into separate pieces or combined. For example, the start time and end time blackout rule elements may be combined in one embodiment. In other embodiments, the zips sub-element may be divided into sub-elements such as partial-zips and complete-zips. The specific names and descriptions above are examples of one embodiment and should not be construed as complete or total.

Figure 5:
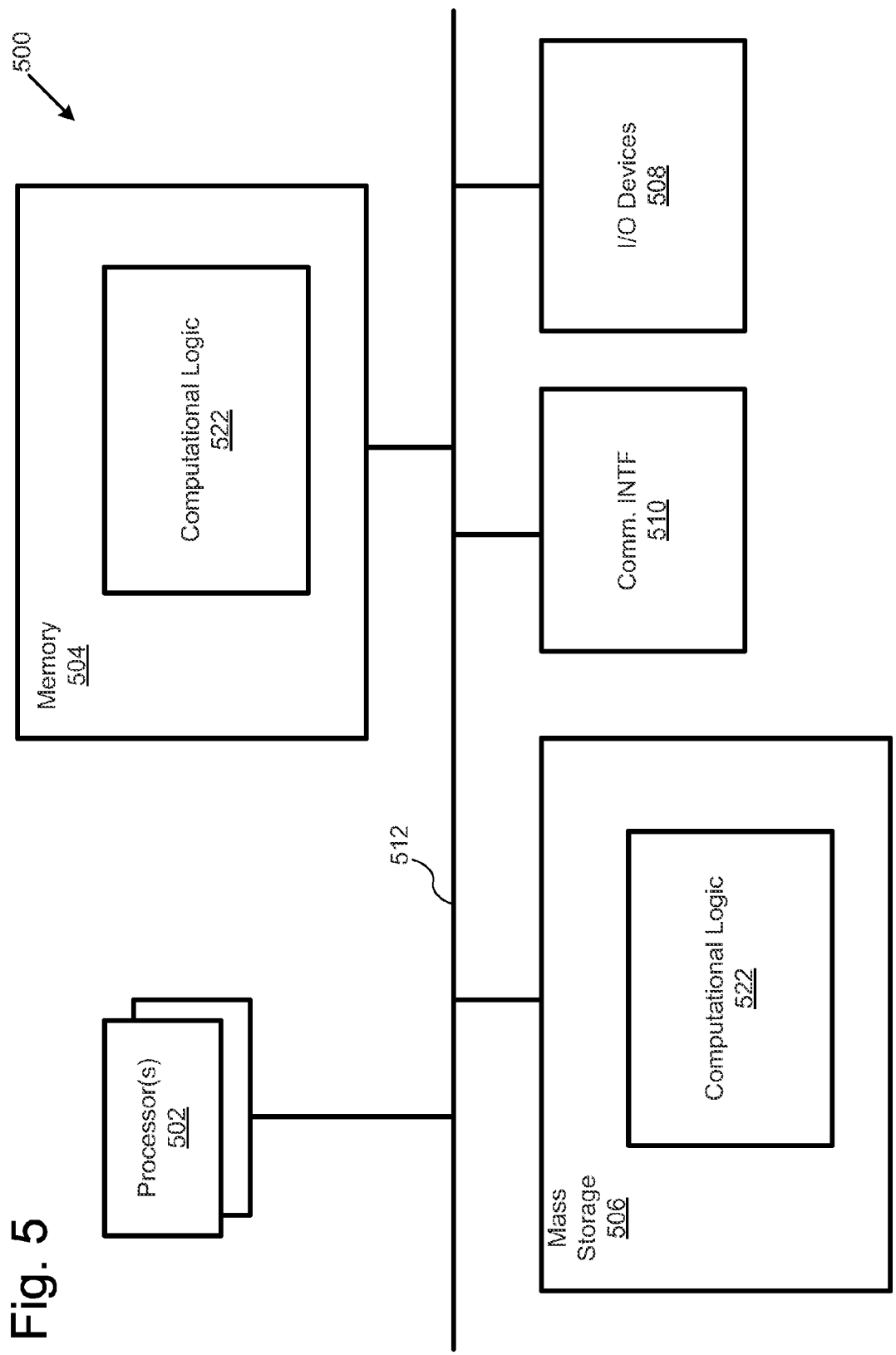
FIG. 5 illustrates an example computing environment suitable for practicing the disclosure, in accordance with various embodiments.

Referring now to FIG. 5, an example computer suitable for use for the arrangement of FIG. 1, in accordance with various embodiments, is illustrated. In embodiments, the computer 500 may be suitable for use as a stationary or mobile computing device. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with content aggregator/distributor server 104, the blackout rule server 138 or the content consumption device 108. The various elements may be implemented by assembler instructions supported by processor(s) 502 or high-level languages, such as, for example, C, that can be compiled into such instructions.

The permanent copy of the programming instructions may be placed into permanent storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The number, capability and/or capacity of these elements 510-512 may vary, depending on whether computer 500 is used as a content aggregator/distributor server 104, a blackout rule server 138, or a content consumption device 108, whether the content consumption device 108 is a stationary or mobile device, like a smartphone, computing tablet, ultrabook or laptop. Their constitutions are otherwise known, and accordingly will not be further described.

Figure 6:
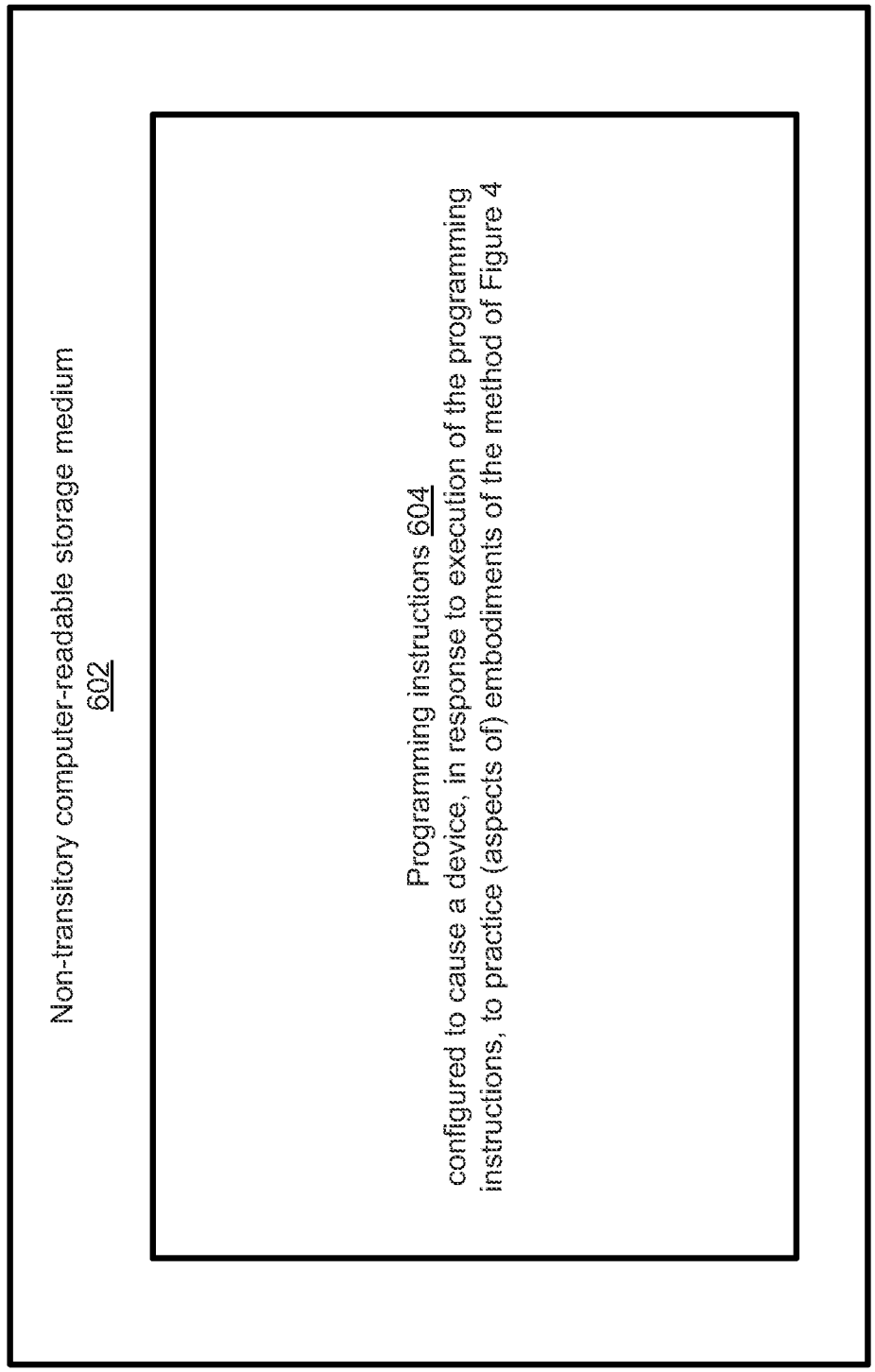
FIG. 6 illustrates an example storage medium with instructions configured to enable an apparatus to practice the present disclosure, in accordance with various embodiments.

FIG. 6 illustrates an example non-transitory computer-readable storage medium having instructions configured to practice all or selected ones of the operations associated with content aggregator/distributor servers 104, content consumption device(s) 108, and/or blackout rule server 138; in accordance with various embodiments. As illustrated, non-transitory computer-readable storage medium 602 may include a number of programming instructions 604. Programming instructions 604 may be configured to enable a device, e.g., computer 500, in response to execution of the programming instructions, to perform, e.g., various operations of process 400 of FIG. 4. In alternate embodiments, programming instructions 604 may be disposed on multiple non-transitory computer-readable storage media 602 instead.

Referring back to FIG. 5, for one embodiment, at least one of processors 502 may be packaged together with computational logic 522 configured to practice aspects of process 400 of FIG. 4. For one embodiment, at least one of processors 502 may be packaged together with computational logic 522 configured to practice aspects of process 400 of FIG. 4 to form a System in Package (SiP). For one embodiment, at least one of processors 502 may be integrated on the same die with computational logic 522 configured to practice aspects of process 400 of FIG. 4. For one embodiment, at least one of processors 502 may be packaged together with computational logic 522 configured to practice aspects of process 400 of FIG. 4 to form a System on Chip (SoC). For at least one embodiment, the SoC may be utilized in, e.g., but not limited to, a computing tablet.

The various embodiments of the present disclosure have been described including, but are not limited to:

Example 1 is a system for limiting access to media content including a receiver to receive the media content and an encoder coupled to the receiver. The encoder may be configured to identify a blackout rule describing one or more limitations to access to the piece of media content; generate one or more segments of content from the piece of media content; and insert a rule identifier into each segment in the plurality of segments of content, the rule identifier identifying the blackout rule.

Example 2 may include the subject matter of example 1, and further specify that the receiver and the encoder are hosted by a computing device, and the system may further include a server coupled to the computing device and configured to provide the blackout rule in response to a request for the blackout rule, the request including the rule identifier.

Example 3 may include the subject matter of example 1, and further specify that the one or more limitations to access to the piece of media content include limitations on time, date, geographical area, and/or consumer identity.

Example 4 may include the subject matter of example 1, and further specify that the encoder is further configured to insert a signature into each segment in the plurality of segments of content, the signature being based at least in part on the rule identifier.

Example 5 may include the subject matter of example 1, and further specify that the encoder is further configured to insert a rule identifier identifying a first blackout rule into a first segment in the plurality of segments of content, and the encoder is further configured to insert a rule identifier identifying a second blackout rule into a second segment in the plurality of segments of content.

Example 6 may include the subject matter of any of claims 1-5, and further specify that the blackout rule includes a start time or an end time, the start time indicating a time and/or date when access to the content should begin to be limited and the end time indicating a time and/or date when access to the content should cease to be limited.

Example 7 may include the subject matter of any of claims 1-5, and further specify that the encoder is further configured to insert the rule identifier as a segment data box (SDB) in a segment of the plurality of segments, the SDB including the rule identifier.

Example 8 may be a method of limiting access to a piece of media content including generating, by a computing device, one or more segments of content from the piece of media content; identifying, by the computing device, a blackout rule describing one or more limitations to access to the piece of media content; and inserting, by the computing device, a rule identifier into each segment in the plurality of segments of content, the rule identifier identifying the blackout rule.

Example 9 may include the subject matter of example 8, and further specify that the one or more limitations to access to the piece of media content include limitations on time, date, geographical area, and/or consumer identity.

Example 10 may include the subject matter of example 8, and further include inserting, by the computing device, a signature into each segment in the plurality of segments of content, the signature being based at least in part on the rule identifier.

Example 11 may include the subject matter of any of examples 8-10, and further specify that a first rule identifier inserted into a first segment in the plurality of segments identifies a first blackout rule, and a second rule identifier inserted into a second segment in the plurality of segments identifies a second blackout rule.

Example 12 may include the subject matter of any of examples 8-10, and further specify that the blackout rule includes a start time or an end time, the start time indicating a time and/or date when access to the content should begin to be limited and the end time indicating a time and/or date when access to the content should cease to be limited.

Example 13 may include the subject matter of any of examples 8-10, and further specify that inserting the rule identifier includes inserting, by the computing device, a segment data box (SDB) into each segment, the SDB including the rule identifier.

Example 14 may include the subject matter of any of examples 8-10, and further specify that a first rule identifier inserted into a segment in the plurality of segments identifies a first blackout rule, and a second rule identifier inserted into the segment in the plurality of segments identifies a second blackout rule.

Example 15 may be a method for limiting access to media content, the method including receiving, by a computing device, a segment of media content, the media content including a plurality of segments; identifying, by the computing device, a rule identifier in the segment of media content; retrieving, by the computing device, a blackout rule based at least in part on the rule identifier, the blackout rule describing one or more limitations to access to the piece of media content; and limiting, by the computing device, access to the media content based at least in part on the blackout rule.

Example 16 may include the subject matter of example 15, and further include authenticating a signature of the segment, the signature based at least in part on the rule identifier.

Example 17 may include the subject matter of example 15, and further specify that one or more limitations to access to the piece of media content include limitations on time, date, geographical area, and/or consumer identity.

Example 18 may include the subject matter of any of examples 15-17, and further specify that the segment is a first segment, the rule identifier is a first rule identifier, and the blackout rule is a first blackout rule. Example 18 may further include receiving, by the computing device, a second segment of media content; identifying, by the computing device, a second rule identifier in the second segment of media content; and retrieving, by the computing device, a second blackout rule based at least in part on the second rule identifier, the second blackout rule being different than the first blackout rule.

Example 19 may include the subject matter of any of examples 15-17, and further specify that the blackout rule includes a start time or an end time, the start time indicating a time and/or date when limiting access to the media content based at least in part on the blackout rule should begin and the end time indicating a time and/or date when limiting access to the media content based at least in part on the blackout rule should end.

Example 20 may include the subject matter of any of examples 15-17, and further specify that the media content is a first media content, and limiting access to the media content includes displaying a second media content in response to a request to view the first media content.

Example 21 may be an apparatus for limiting access to media content, the apparatus including one or more computer processors and a decoder configured to operate on the one or more computer processors. The decoder may be configured to receive a segment of media content, the media content including a plurality of segments; identify a rule identifier in the segment of media content; authenticate a signature of the segment, the signature based at least in part on the rule identifier, request, based at least in part on the rule identifier, a blackout rule from a server, the blackout rule describing one or more limitations to access to the piece of media content; receive, based at least in part on the request, the blackout rule; and limit access to the media content based at least in part on the blackout rule.

Example 22 may include the subject matter of example 21, and further specify that the decoder is further configured to authenticate a signature of the segment, the signature based at least in part on the rule identifier.

Example 23 may include the subject matter of example 21, and further specify that the one or more limitations to access to the piece of media content include limitations on time, date, geographical area, and/or consumer identity.

Example 24 may include the subject matter of any of examples 21-23, and further specify that the segment is a first segment, the rule identifier is a first rule identifier, and the blackout rule is a first blackout rule. Example 24 may further specify that the decoder is further configured to receive a second segment of media content; identify a second rule identifier in the second segment of media content; and retrieve a second blackout rule based at least in part on the second rule identifier, the second blackout rule being different than the first blackout rule.

Example 25 may include the subject matter of any of examples 21-23, and further specify that the blackout rule includes a start time or an end time to limit access to the media content based at least in part on the blackout rule.

Example 26 may be one or more computer readable media including instructions to limit access to a piece of media content. The instructions may be configured to cause an apparatus, in response to execution of the instructions by the apparatus, to generate one or more segments of content from the piece of media content; identify a blackout rule describing one or more limitations to access to the piece of media content; and insert a rule identifier into each segment in the plurality of segments of content, the rule identifier identifying the blackout rule.

Example 27 may include the subject matter of example 26, and further specify that the one or more limitations to access to the piece of media content include limitations on time, date, geographical area, and/or consumer identity.

Example 28 may include the subject matter of example 26, and further specify that the instructions are further configured to cause the apparatus, in response to execution of the instructions by the apparatus, to insert a signature into each segment in the plurality of segments of content, the signature being based at least in part on the rule identifier.

Example 29 may include the subject matter of any of examples 26-28, and further specify that a first rule identifier inserted into a first segment in the plurality of segments identifies a first blackout rule, and a second rule identifier inserted into a second segment in the plurality of segments identifies a second blackout rule.

Example 30 may include the subject matter of any of examples 26-28, and further specify that the blackout rule includes a start time or an end time, the start time indicating a time and/or date when access to the content should begin to be limited and the end time indicating a time and/or date when access to the content should cease to be limited.

Example 31 may include the subject matter of any of examples 26-28, and further specify that inserting the rule identifier includes inserting a segment data box (SDB) into each segment, the SDB including the rule identifier.

Example 32 may include the subject matter of any of examples 26-28, and further specify that a first rule identifier inserted into a segment in the plurality of segments identifies a first blackout rule, and a second rule identifier inserted into the segment in the plurality of segments identifies a second blackout rule.

Example 33 may be one or more computer readable media including instructions to limit access to media content. The instructions may be configured to cause an apparatus, in response to execution of the instructions by the apparatus, to receive a segment of media content, the media content including a plurality of segments; identify a rule identifier in the segment of media content; retrieve a blackout rule based at least in part on the rule identifier, the blackout rule describing one or more limitations to access to the piece of media content; and limit access to the media content based at least in part on the blackout rule.

Example 34 may include the subject matter of example 33, and further specify that the instructions are further configured to cause the apparatus, in response to execution of the instructions by the apparatus, to authenticate a signature of the segment, the signature based at least in part on the rule identifier.

Example 35 may include the subject matter of example 33, and further specify that the one or more limitations to access to the piece of media content include limitations on time, date, geographical area, and/or consumer identity.

Example 36 may include the subject matter of any of examples 33-35, and further specify that the segment is a first segment, the rule identifier is a first rule identifier, and the blackout rule is a first blackout rule. Further, example 36 may specify that the instructions are further configured to cause the apparatus, in response to execution of the instructions by the apparatus, to receive a second segment of media content; identify a second rule identifier in the second segment of media content; and retrieve a second blackout rule based at least in part on the second rule identifier, the second blackout rule being different than the first blackout rule.

Example 37 may include the subject matter of any of examples 33-35, wherein the blackout rule includes a start time or an end time, the start time indicating a time and/or date when limiting access to the media content based at least in part on the blackout rule should begin and the end time indicating a time and/or date when limiting access to the media content based at least in part on the blackout rule should end.

Example 38 may include the subject matter of any of examples 33-35, wherein the media content is a first media content, and limiting access to the media content includes displaying a second media content in response to a request to view the first media content.

Example 39 may be an apparatus configured to limit access to a piece of media content, the apparatus including means for generating one or more segments of content from the piece of media content; means for identifying a blackout rule describing one or more limitations to access to the piece of media content; and means for inserting a rule identifier into each segment in the plurality of segments of content, the rule identifier identifying the blackout rule.

Example 40 may include the subject matter of example 39, and further specify that the one or more limitations to access to the piece of media content include limitations on time, date, geographical area, and/or consumer identity.

Example 41 may include the subject matter of example 39, and further including means for inserting a signature into each segment in the plurality of segments of content, the signature being based at least in part on the rule identifier.

Example 42 may include the subject matter of any of examples 39-41, and further specify that a first rule identifier inserted into a first segment in the plurality of segments identifies a first blackout rule, and a second rule identifier inserted into a second segment in the plurality of segments identifies a second blackout rule.

Example 43 may include the subject matter of any of examples 39-41, and further specify that the blackout rule includes a start time or an end time, the start time indicating a time and/or date when access to the content should begin to be limited and the end time indicating a time and/or date when access to the content should cease to be limited.

Example 44 may include the subject matter of any of examples 39-41, and further specify that the inserting the rule identifier includes inserting a segment data box (SDB) into each segment, the SDB including the rule identifier.

Example 45 may include the subject matter of any of examples 39-41, and further specify that a first rule identifier inserted into a segment in the plurality of segments identifies a first blackout rule, and a second rule identifier inserted into the segment in the plurality of segments identifies a second blackout rule.

Example 46 may be an apparatus configured to limit access to media content, the apparatus including means for receiving a segment of media content, the media content including a plurality of segments; means for identifying a rule identifier in the segment of media content; means for retrieving a blackout rule based at least in part on the rule identifier, the blackout rule describing one or more limitations to access to the piece of media content; and means for limiting access to the media content based at least in part on the blackout rule.

Example 47 may include the subject matter of example 46, and further include means for authenticating a signature of the segment, the signature based at least in part on the rule identifier.

Example 48 may include the subject matter of example 46, and further specify that the one or more limitations to access to the piece of media content include limitations on time, date, geographical area, and/or consumer identity.

Example 49 may include the subject matter of any of examples 46-48, and further specify that the segment is a first segment, the rule identifier is a first rule identifier, and the blackout rule is a first blackout rule. Example 49 may further include means for receiving a second segment of media content; means for identifying a second rule identifier in the second segment of media content; and means for retrieving a second blackout rule based at least in part on the second rule identifier, the second blackout rule being different than the first blackout rule.

Example 50 may include the subject matter of any of examples 46-48, and further specify that the blackout rule includes a start time or an end time, the start time indicating a time and/or date when limiting access to the media content based at least in part on the blackout rule should begin and the end time indicating a time and/or date when limiting access to the media content based at least in part on the blackout rule should end.

Example 51 may include the subject matter of any of examples 46-48, and further specify that the media content is a first media content, and limiting access to the media content includes displaying a second media content in response to a request to view the first media content.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer readable media comprising instructions to cause a computer apparatus in response to execution of the instructions, to:
   generate, by the computer apparatus, a plurality of segments of content from a piece of media content;
   identify, by the computer apparatus, a blackout rule, the blackout rule comprising a broadcast blackout of the piece of media content; and
   insert, by the computer apparatus, a blackout rule identifier into a segment of the plurality of segments of content, the blackout rule identifier identifying the blackout rule, wherein the blackout rule identifier comprises a location identifier that identifies a location on a server, from which location the blackout rule is obtained by a content consumption device, wherein the server is remote from, and accessible over a network by, the content consumption device; and
   insert, by the computer apparatus, a signature into the segment of the plurality of segments of content, the signature being based at least in part on the blackout rule identifier comprising the location identifier.

2. The one or more non-transitory computer readable media of claim 1, the blackout rule describing one or more limitations to access to the piece of media content, wherein the one or more limitations to access to the piece of media content comprise limitations on time, date, geographical area, and/or consumer identity.

3. The one or more non-transitory computer readable media of claim 1, wherein the blackout rule identifier is a first blackout rule identifier and the content consumption device is a first content consumption device and wherein the instructions are further to insert a second blackout rule identifier into a second segment of the plurality of segments, wherein the second blackout rule identifier identifies a second blackout rule, wherein the second blackout rule identifier comprises a second location identifier that identifies a second location on the server from which the second blackout rule is obtained by the first or a second content consumption device.

4. The one or more non-transitory computer readable media of claim 1, wherein the blackout rule comprises a start time or an end time, the start time indicating a time and/or date when access to the content should begin to be limited, and the end time indicating a time and/or date when access to the content should cease to be limited.

5. The one or more non-transitory computer readable media of claim 1, wherein insert the blackout rule identifier comprises insert a segment data box (SDB) into the segment of the plurality of segments of content, the SDB comprising the blackout rule identifier.

6. The one or more non-transitory computer readable media of claim 1, wherein the blackout rule identifier is a first blackout rule identifier and wherein insert the blackout rule identifier comprises insert the first blackout rule identifier into the segment of the plurality of segments, the first blackout rule identifier identifying a first blackout rule, and insert a second blackout rule identifier into the segment of the plurality of segments, the second blackout rule identifier identifying a second blackout rule, wherein the first blackout rule identifier comprises a first location identifier that identifies a first location on the server from which the first blackout rule can be obtained by a first or a second content consumption device and the second blackout rule identifier comprises a second location identifier that identifies a second location on the server from which the second blackout rule can be obtained by the first or the second content consumption device.

7. A system for limiting access to a piece of media content comprising:
   a computer processor and memory;
   a receiver to receive the piece of media content; and
   an encoder coupled to the receiver, the encoder using the processor to:
      identify a blackout rule, the blackout rule comprising a broadcast blackout of the piece of media content;
      generate a plurality of segments of content from the piece of media content;
      insert a blackout rule identifier into a segment of the plurality of segments of content, the blackout rule identifier identifying the blackout rule, wherein the blackout rule identifier comprises a location identifier that identifies a location on a server from which the blackout rule can be obtained by a content consumption device, wherein the server is remote from, and accessible over a network by, the content consumption device; and
      insert a signature into the segment of the plurality of segments of content, the signature being based at least in part on the blackout rule identifier comprising the location identifier.

8. The system of claim 7, wherein the receiver and the encoder are hosted by a computer device, and the system further comprising a server coupled to the computer device and to provide the blackout rule in response to a request for the blackout rule, the request including the blackout rule identifier.

9. The system of claim 7, the blackout rule describing one or more limitations to access to the piece of media content, wherein the one or more limitations to access to the piece of media content comprise limitations on time, date, geographical area, and/or consumer identity.

10. The system of claim 7, wherein the blackout rule identifier is a first blackout rule identifier, the blackout rule is a first blackout rule, the segment of the plurality of segments is a first segment of the plurality of segments, the location identifier is a first location identifier, and the location is a first location, and wherein the encoder is further to insert a second blackout rule identifier identifying a second blackout rule into a second segment of the plurality of segments of content, wherein the second blackout rule identifier comprises a second location identifier that identifies a second location on the server with the second blackout rule, wherein the second blackout rule is different than the first blackout rule.

11. The system of claim 7, wherein the blackout rule comprises a start time or an end time, the start time indicating a time and/or date when access to the piece of media content should begin to be limited, and the end time indicating a time and/or date when access to the piece of media content should cease to be limited.

12. The system of claim 7, wherein the encoder is further to insert the blackout rule identifier as a segment data box (SDB) in the segment of the plurality of segments, the SDB comprising the blackout rule identifier.

13. A method for limiting access to a media content segmented into a plurality of segments, the method comprising:
receiving, by a computer device comprising a processor and a memory, a segment of the plurality of segments of the media content;
identifying, by the computer device, a blackout rule identifier in the segment of the plurality of segments of the media content, wherein the blackout rule identifier comprises a location identifier that identifies a location on a server from which a blackout rule is obtained, wherein the server is remote from, and accessible over a network by, the computer device;
retrieving, by the computer device, from the server the blackout rule based at least in part on the blackout rule identifier and the location identifier, the blackout rule comprising a broadcast blackout of the segment of the plurality of segments of the media content;
authenticating, by the computer device, a signature of the segment, the signature based at least in part on the blackout rule identifier comprising the location identifier; and
limiting, by the computer device, access to the media content based at least in part on the blackout rule.

14. The method of claim 13, the blackout rule describing one or more limitations to access to the media content, wherein the one or more limitations to access to the media content comprise limitations on time, date, geographical area, and/or consumer identity.

15. The method of claim 13, wherein the segment is a first segment, the blackout rule identifier is a first blackout rule identifier, and the blackout rule is a first blackout rule, and further comprising:
receiving, by the computer device, a second segment of the plurality of segments of the media content;
identifying, by the computer device, a second blackout rule identifier in the second segment of the plurality of segments of the media content, wherein the second blackout rule identifier comprises a second location identifier that identifies a second location on the server from which a second blackout rule is obtained; and
retrieving, by the computer device, from the server the second blackout rule based at least in part on the second blackout rule identifier and the second location identifier, the second blackout rule being different than the first blackout rule.

16. The method of claim 13, wherein the blackout rule comprises a start time or an end time, the start time indicating a time and/or date when limiting access to the media content based at least in part on the blackout rule should begin, and the end time indicating a time and/or date when limiting access to the media content based at least in part on the blackout rule should end.

17. The method of claim 13, wherein the media content is a first media content, and limiting access to the media content comprises displaying a second media content in response to a request to view the first media content.

18. An apparatus for limiting access to a media content segmented into a plurality of segments, the apparatus comprising:
one or more computer processors and a memory; and
a decoder to operate on the one or more computer processors to cause the one or more computer processors, in response to execution of instructions in the memory, to:
receive a segment of the plurality of segments of the media content;
identify a blackout rule identifier in the segment of media content, wherein the blackout rule identifier comprises a location identifier that identifies a location on a server with a blackout rule, wherein the server is remote from, and accessible over a network by, the decoder;
authenticate a signature of the segment, the signature based at least in part on the blackout rule identifier comprising the location identifier;
request, based at least in part on the blackout rule identifier and the location identifier, a blackout rule from the server, the blackout rule comprising a broadcast blackout of the segment of the plurality of segments of the media content;
receive, based at least in part on the request, the blackout rule; and
limit access to the media content based at least in part on the blackout rule.

19. The apparatus of claim 18, wherein limit access to the media content based at least in part on the blackout rule further comprises limits on time, date, geographical area, and/or consumer identity.

20. The apparatus of claim 18, wherein the segment is a first segment, the blackout rule identifier is a first blackout rule identifier, and the blackout rule is a first blackout rule, and the decoder is further to:
receive a second segment of the plurality of segments of the media content;
identify a second blackout rule identifier in the second segment of media content, wherein the second blackout rule identifier comprises a second location identifier that identifies a second location on the server with a second blackout rule, wherein the server is remote from, and accessible over a network by, the decoder; and
retrieve the second blackout rule based at least in part on the second blackout rule identifier and the second location identifier, the second blackout rule being different than the first blackout rule.

21. The apparatus of claim 18, wherein the blackout rule comprises a start time or an end time, the start time indicating a time and/or date to begin to limit access to the media content based at least in part on the blackout rule, and the end time indicating a time and/or date to cease to limit access to the media content based at least in part on the blackout rule.

* * * * *